US008799608B1

(12) United States Patent
Raizen et al.

(10) Patent No.: US 8,799,608 B1
(45) Date of Patent: Aug. 5, 2014

(54) TECHNIQUES INVOLVING FLAKY PATH DETECTION

(75) Inventors: Helen S. Raizen, Jamaica Plain, MA (US); Michael E. Bappe, Loveland, CO (US); Harold M. Sandstrom, Belmont, MA (US); Vinay G. Rao, Karnataka (IN); Nihar R. Panda, Karnataka (IN)

(73) Assignee: EMC Corporation, Hopkinton, MA (US)

( * ) Notice: Subject to any disclaimer, the term of this patent is extended or adjusted under 35 U.S.C. 154(b) by 237 days.

(21) Appl. No.: 13/339,669

(22) Filed: Dec. 29, 2011

(51) Int. Cl.
*G06F 15/177* (2006.01)
*G06F 13/16* (2006.01)

(52) U.S. Cl.
USPC .......................................................... 711/168

(58) Field of Classification Search
CPC .............. G06F 11/008; G06F 11/2005; G06F 11/2007; G06F 11/201; G06F 11/2069; G06F 11/2089; G06F 11/34; G06F 13/4022; G06F 2003/0692; G06F 3/0601; G06F 11/1458; G06F 11/1469
See application file for complete search history.

(56) References Cited

U.S. PATENT DOCUMENTS

2008/0288671 A1* 11/2008 Masuda ........................... 710/38
2009/0271541 A1* 10/2009 Aoki et al. ....................... 710/38

OTHER PUBLICATIONS

Symantec, "Veritas Volume Manager 5.0 MP1 known issues, Veritas Volume Manager know issues", http://sfdoccentral.symantec.com/sf/5.0MP3/solaris/html/sf_notes/ch01s09s03s02.htm, pp. 1-4.

* cited by examiner

*Primary Examiner* — Matthew Bradley
*Assistant Examiner* — Candice Rankin
(74) *Attorney, Agent, or Firm* — BainwoodHuang

(57) ABSTRACT

A technique oversees a path between a multipathing driver of a host computer and a volume of a data storage array. The technique involves, while the multipathing driver of the host computer sends input/output requests (IOs) to the volume of the data storage array on the path, generating an IOs-Over-Period metric based on outcomes of the IOs, the IOs-Over-Period metric providing a measure of IOs per failure over a period of path operation. The technique further involves performing a comparison operation which compares the IOs-Over-Period metric to a predefined flaky path range having a predefined lower limit and a predefined upper limit. The technique further involves, after performing the comparison operation, outputting a detection signal indicating that the path is (i) flaky when the IOs-Over-Period metric falls within the predefined flaky path range and (ii) non-flaky when the IOs-Over-Period metric falls outside of the predefined flaky path range.

20 Claims, 7 Drawing Sheets

TECHNIQUES INVOLVING FLAKY PATH DETECTION

BACKGROUND

"Multipathing" refers to the ability of software running on a host computer to access a volume or a logical unit (LUN) of storage of a data storage array through multiple paths. The software may uniquely identify each path to a LUN via a port of the host computer, a port of the data storage array, and the LUN. In the context of SCSI (small computer system interface), this is referred to as the I-T-L nexus, i.e., Initiator port to Target port to LUN.

Typically, if the software running on the host computer is unable to perform an I/O operation to a volume of the array on an initial path, the software retries the I/O operation to the volume on another path and labels the initial path for path testing. If path testing of the initial path fails, the software marks the initial path as a "dead" path until periodic testing determines that the initial path is functional again.

Nevertheless, the host computer and the data storage array are able to remain operational as a whole since the software can continue to access the volume on one or more remaining "alive" paths. PowerPath® which is offered by EMC Corporation of Hopkinton, Mass. is an example of a multipathing software product.

SUMMARY

There are improvements available to the above-described conventional multipathing approach. For example, in the above-described approach, it is possible for a path to a volume to become "flaky", i.e., fail intermittently. One kind of flaky path always fails SCSI read commands and SCSI write commands, but always succeeds a SCSI inquiry command. Another kind of flaky path fails SCSI read and write commands that involve a large amount of data, but succeeds SCSI read and write commands that involve a small amount of data as well as SCSI inquiry commands. Other flaky path behaviors may exist as well such as a switch port or an initiator port that is intermittently failing, causing any input/output (IO) request to intermittently fail when going through that component.

If SCSI read and write commands on a path are failing (either all the time or intermittently), but the path test on the path always succeeds, then the software never marks the path dead. Rather, the software will continue to treat the flaky paths as fully operational. Thus, the software will continue to encounter failed SCSI commands on flaky paths and then continue to retry the SCSI commands down other paths until the SCSI commands succeed. Additionally, when a path test such as a SCSI inquiry command intermittently fails, the path may bounce between the "dead" state and the "alive" state. While this problematic path is in the "alive" state, this path may cause a considerable number of errors. In these and similar situations, such operation results in increased response time as well as inefficient use of host resources.

In contrast to the above-described conventional multipathing approach, improved techniques involve a multipathing driver performing a flaky path detection operation under certain conditions to determine whether a path to a volume is flaky. In particular, after a read or write request fails on an initial path but a retry of that IO request succeeds on another path, the multipathing driver performs a flaky path detection operation to evaluate the initial path. Additionally, after an inquiry request fails on a path, the multipathing driver performs a flaky path detection operation to evaluate that path.

When the multipathing driver performs a flaky path detection operation to evaluate a path, the driver examines the number of IO requests (or simply IOs) that the driver sent on that path over a period in which a set number of IO failures occurred on that path (e.g., three IO failures). If the number of IOs that the driver sent on that path over that period is the same as the set number of IO failures that occurred, the average number of IOs per failure on that path is 1 (i.e., every IO over that period failed) and the driver proceeds with normal processing. That is, if the most recent failure is an inquiry that is part of the path test, then the driver marks the path as "dead" or if the most recent failure is a read or write IO, then the driver marks the path for testing. However, if the number of IOs that the driver sent on that path over that period is greater than the set number of IO failures that occurred, the average number of IOs per failure on that path is greater than 1 (i.e., at least one IO over that period succeeded) and the driver marks that path as "flaky" and performs a flaky path remedial measure regarding that path.

One embodiment is directed to a method of overseeing a path between a multipathing driver of a host computer and a volume of a data storage array. The method includes, while the multipathing driver of the host computer sends input/output requests (IOs) to the volume of the data storage array on the path, generating an IOs-Over-Period metric based on outcomes of the IOs, the IOs-Over-Period metric providing a measure of IOs per failure over a period of path operation. The method further includes performing a comparison operation which compares the IOs-Over-Period metric to a predefined flaky path range having a predefined lower limit and a predefined upper limit. The method further includes, after performing the comparison operation, outputting a detection signal indicating that the path is (i) flaky when the IOs-Over-Period metric falls within the predefined flaky path range and (ii) non-flaky when the IOs-Over-Period metric falls outside of the predefined flaky path range.

In some arrangements, the predefined upper limit of the predefined flaky path range is initially set to some default value (e.g., 6000). As will be explained in further detail below, this upper limit can be adjusted by a user.

Other embodiments are directed to systems, apparatus, processing circuits, computer program products, and so on. Some embodiments are directed to various methods, electronic components and circuitry which are involved in overseeing a path between a host computer and a volume of a data storage array.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Figure 1:
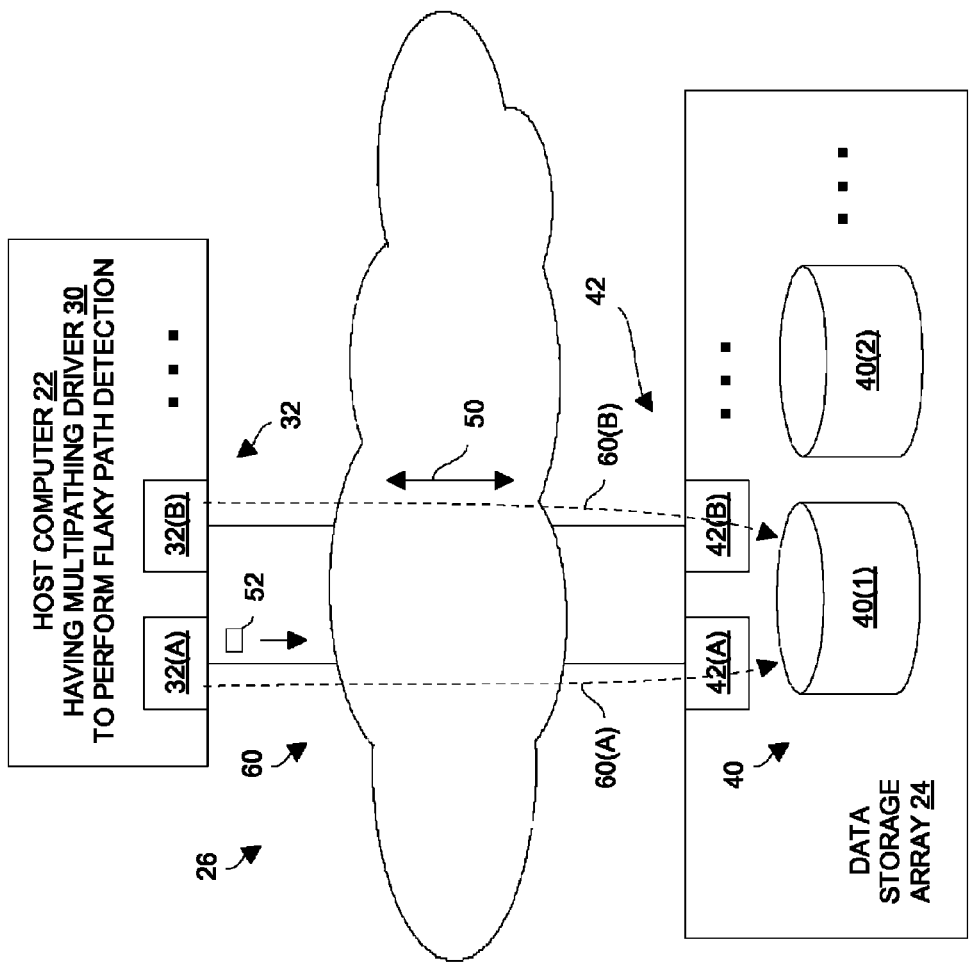
FIG. 1 is a block diagram of a data storage environment which is equipped with enhanced flaky path detection.

FIG. 1 shows a data storage environment 20 which includes a host computer 22, a data storage array 24, and a storage interconnection network 26. The host computer 22 includes a multipathing driver 30 and multiple host ports 32(A), 32(B), ... (collectively, host ports 32) to the interconnection network 26. The data storage array 24 includes volumes or logical units (LUNs) 40(1), 40(2), ... of storage (collectively, volumes 40), and multiple array ports 42(A), 42(B), ... (collectively, array ports 42). The interconnection network 26 may include physical cabling, switches, etc. in order to convey electronic signals 50 between the host ports 32 and the array ports 42.

The host computer 22 is constructed and arranged to perform useful work such as issuing IO requests 52 to write data to and read data from the data storage array 24. Via the multipathing driver 30, the host computer 22 is able to utilize multiple paths 60 to each volume 40 for load balancing, fault tolerance, etc. For example, a first path 60(A) exists to the volume 40(1) through the host port 32(A) and the array port 42(A) (see the dashed arrow 60(A)). Additionally, a second path 60(B) exists to the volume 40(1) through the host port 32(B) and the array port 42(B) (the dashed arrow 60(B)). Other paths 60 to the volume 40(1) may exist as well (e.g., another path 60 through the host port 32(A) and the array port 42(B) due to switches within the interconnection network 26, and so on).

While the multipathing driver 30 issues IO requests 52 to volumes 40 on the paths 60, the multipathing driver 30 generates, for each path 60, an IOs-Over-Period metric to determine whether that path 60 is flaky. Further details of the IOs-Over-Period metric are provided below. If an evaluation of the IOs-Over-Period metric indicates that a path 60 is flaky, the multipathing driver 30 performs a remedial measure such as transitioning the flaky path 60 to an autostandby mode in which the host computer 22 uses the flaky path 60 only as a last resort, alerting a human, initiating a root cause analysis routine, combinations thereof, etc.

Figure 2:
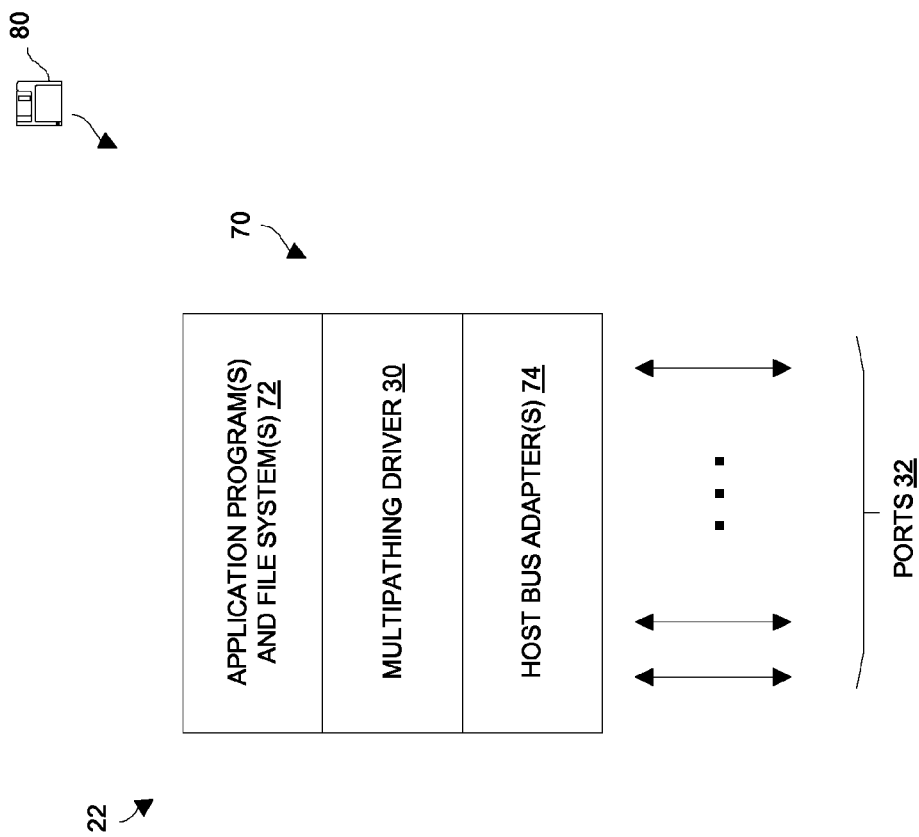
FIG. 2 is a block diagram illustrating particular components of a host computer of FIG. 1.

FIG. 2 shows pertinent structure and organization of the host computer 22. It will be appreciated that from a hardware perspective the host computer 22 includes computerized circuitry 70 including one or more processors, memory, data buses and input/output circuitry, etc. (illustrated generally by the arrow 70). This circuitry 70 executes computer instructions that form various programs, routines, etc., normally including an operating system and one or more application programs in order to form specialized equipment which performs the operations described herein. Along these lines, FIG. 2 illustrates application program(s) and file system(s) 72 to control the high level operation of the host computer 22, a multipathing driver 30 for storage IO operations, and host bus adapter(s) or HBA(s) 74 which include(s) hardware circuitry that interfaces the host computer 22 to the interconnection network 26 via one or more host ports 32 (also see FIG. 1).

It should be understood that the host computer 22 may have one or more HBAs 74, and that each HBA 74 may have one or more respective ports 32. Furthermore, the multipathing driver 30 typically forms part of an operating system of the host computer 22. As a driver of the operating system, it handles all storage IO commands from the application 72 directed to the data storage array 24. In particular, while the processing circuitry of the host computer 22 runs code of the multipathing driver 30, a specialized circuit is formed which processes IO requests and responses as they flow from the application 72 to the array 24 and back. In this context, the specialized circuit (which is referred to herein as the multipathing driver 30 for simplicity) performs flaky path detection and avoidance techniques.

It should be further understood that a computer program product 80 is capable of delivering all or portions of these above-mentioned software constructs to the host computer 22. Along these lines, the computer program product 80 includes a non-transitory (or non-volatile) computer readable medium which stores a set of instructions to control one or more operations of the host computer 22. Examples of suitable non-transitory computer readable media include tangible articles of manufacture and apparatus which store instructions in a non-volatile manner such as CD-ROM, flash memory, disk memory, tape memory, and the like.

Figure 3:
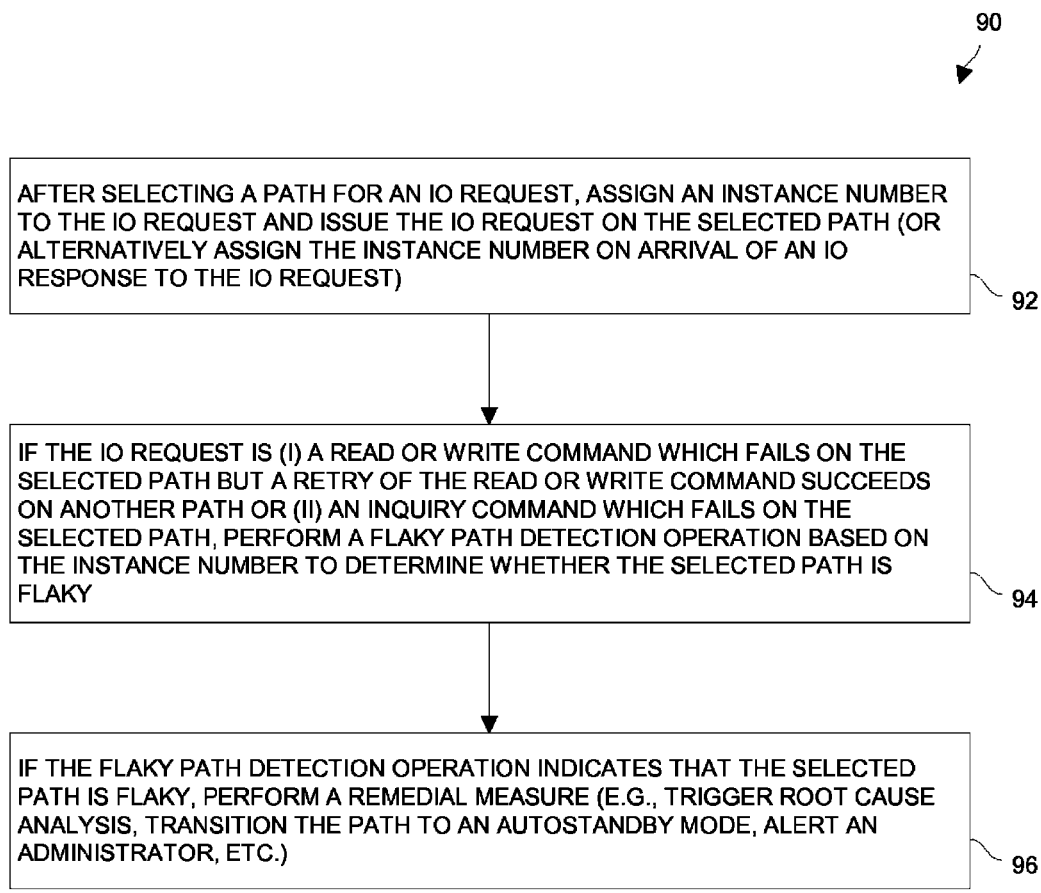
FIG. 3 is a block diagram illustrating particular activities of a multipathing driver of the host computer.

FIG. 3 shows a diagram 90 illustrating particular operation of the multipathing driver 30 in connection with processing an IO request 52 on a selected path 60 to a specific LUN and determining whether the selected path 60 is flaky. It will be appreciated that each path 60 may be identified or represented by a triplet of values specifying an "initiator", "target" and "LUN", known in the art as an "ITL". In SCSI parlance, an initiator value identifies the source of a SCSI command (e.g., see the host ports 32 in FIG. 1), while a target value identifies the SCSI component to which the command is directed (e.g., see the array ports 42 in FIG. 1). The LUN (logical unit number) identifies the unit of storage that is the subject of the command (e.g., see the volumes 40 in FIG. 1).

As will be explained in further detail below, the multipathing driver 30 is constructed and arranged to assign, for each path 60, monotonically increasing instance numbers to the IO requests 52 issued on that path 60. In particular, the assigned instance numbers ascend with time. Accordingly, higher instance numbers refer to newer IO requests 52, and lower instance numbers refer to older IO requests 52. Eventually, for each path 60, the multipathing driver 30 wraps the instance numbers once the instance numbers reach a certain value.

The multipathing driver 30 is further constructed and arranged to maintain, for each path 60, a sorted list of instance numbers assigned to a set number (e.g., three) of the last IO requests 52 which failed on that path 60 as follows:

(i) SCSI read or write commands which failed on that path 60 but which succeeded down another path 60, or (ii) SCSI inquiry commands which failed on that path 60. Making sure that, if the IO request 52 is a SCSI read or write command, the failed SCSI read or write command succeeds down other path 60 ensures that the sorted list reflects path-based failures and not malformed read/write IO requests 52 which cannot succeed on any path 60.

Once the sorted list for a path 60 is full, the multipathing driver 30 is able to generate an IOs-Over-Period metric which indicates whether that path 60 is flaky. In particular, at 92, the multipathing driver 30 assigns an instance number to an IO request 52 and issues the IO request 52 on a selected path 60 (also see FIG. 1). The IO request 52 may be included in an IO command block passed from a higher-level component of the operating system to the multipathing driver 30, as generally known in the art. The IO request 52 will include, among other things, an identification of the volume 40 to which the IO request 52 is directed. Alternatively, the IO request 52 may be generated by the multipathing driver 30 itself for administrative purposes (e.g., control, diagnostics, etc.). Examples of suitable IO requests 52 include SCSI read commands, SCSI write commands, and SCSI inquiry commands.

At 94, if the issued IO request 52 is (i) a read or write that failed on the selected path 60 but a retry of the IO request 52 succeeds on another path 60 or (ii) an inquiry that failed on the selected path 60, the multipathing driver 30 performs a flaky path detection operation based on the sorted list of instance numbers for the selected path 60 to determine whether the selected path 60 is flaky. Generally speaking, the multipathing driver 30 evaluates the average number of IOs per failure on the selected path 60 against a flaky path range. This evaluation can be represented as follows:

if (IOs-Per-Failure>1) && (IOs-Per-Failure<=upper limit of flaky path range)
{
perform remedial operation
}

Here, IOs-Per-Failure is the parameter for the average number of IOs per failure over a period of operation. If this IOs-Per-Failure parameter is equal to 1, then every IO request 52 on the selected path 60 over that period failed and the multipathing driver 30 labels the path 60 for path testing, i.e., the path 60 is not flaky and likely to be marked dead by path testing. However, if the IOs-Per-Failure parameter is greater than 1 and less than an upper limit of the flaky path range, the multipathing driver 30 considers the path 60 to be flaky. The upper limit of the flaky path range is adjustable and can be initially set to some default value (e.g., 6000).

At 96, if the flaky path detection operation indicates that the selected path 60 is flaky, the multipathing driver 30 performs a remedial measure. For example, the multipathing driver 30 may transition the selected path 60 from an "active" mode of operation to an "autostandby" mode of operation. In the "active" mode of operation, the multipathing driver 22 routinely sends IO requests 52 to the particular volume 40 on the path 60 in a highly available manner. However, in the "autostandby" mode of operation, the multipathing driver 22 sends IO requests 52 to the particular volume 40 on the path 60 in a last resort manner, for instance, only after the multipathing driver 30 has tried all other paths 60 to the volume 40 which were in active mode. Other remedial operations include alerting an administrator and invoking a root cause analysis procedure.

In some arrangements, the multipathing driver 30 alerts a human (e.g., an administrator of the electronic environment 20, a field technician, etc.) as a remedial measure (perhaps among others) in response to flaky path detection. Such an alert may be in the form of an email message, a telephone call, a text message, an alarm, combinations thereof, and so on. Such operation enables a human to jump into action as quickly as possible. Along these lines, sometimes conditions in the cabling itself could cause irregular bounces in the fabric of the path 60, and the human is able to quickly step in and repair or replace that cabling to restore full connectivity between the host computer 22 and the data storage array 24.

In some arrangements, the multipathing driver 30 automatically triggers a root cause analysis routine as the remedial measure in response to flaky path detection. Such operation enables the host computer 22 or an external mechanism to immediately gather further information for diagnosis and correction of the particular cause of the flakiness and perhaps perform additional testing. In some arrangements, an external management mechanism begins a close inspection of the components of the data storage environment 20 as soon as the root cause analysis routine is invoked.

Other remedial measures may include removing the path 60 from service completely, and/or modifying the protocol or signaling schema used through the path 60. Also, it should be understood that various remedial measures can be performed in combination with other remedial measures (e.g., a predefined fault handling routine, periodic testing, etc.).

In some arrangements, when the multipathing driver 30 determines that the path 60 is flaky, the multipathing driver 30 starts a timer or aging circuit that expires after a predetermined amount of time has elapsed (e.g., an hour, a day, seven days, etc.). In these arrangements, the multipathing driver 30 reinstates the path 60 at the expiration of the timer, i.e., after the predetermined amount of time has elapsed.

In some arrangements, the multipathing driver 30 sorts the list of instance numbers with each a new instance number of a failed IO request 52. Such operation accommodates a situation in which IO requests 52 may complete out of their original order. That is, the IO requests 52 may be processed asynchronously. Accordingly, even though each IO request 52 on a particular path 60 is assigned a monotonically increasing instance number (i.e., the instance number assigned to each new IO request 52 is one higher than that assigned to the preceeding IO request 52 on that path 60), the results of the IO requests 52 can return to the multipathing driver 30 in any order. As a result, sorting the list 120 enables the multipathing driver 30 to easily access the lowest instance number from a buffer when calculating the IOs-Over-Period metric.

As mentioned earlier, the multipathing driver 30 performs the same evaluation process separately for each path 60. In particular, the multipathing driver 30 maintains a separate monotonically increasing series of instance numbers (or count) for each path 60. Additionally, the multipathing driver 30 maintains a separate sorted list of a set number of instance numbers (i.e., buffered in memory) for each path 60. Accordingly, the multipathing driver 30 is able to separately oversee the rate of IOs relative to the rate of failures through each path 60 independently.

Suppose that the multipathing driver 30 is constructed and arranged to maintain a separate sorted list of three of instance numbers for each path 60. It should be understood that the distance between two adjacent entries in the sorted list maintained for a specific path represents an interval in which there was exactly one failed IO request 52 on that path 60. Moreover, since there are three instance numbers in the sorted list, the distance between the lowest instance number in the sorted list and the instance number of the most recently dispatched IO request 52 to have failed represents a period of four errors (i.e., three intervals of errors). This distance is referred to as the IOs-Over-Period metric for that path 60 since it represents the number of IOs issued on that path 60 over the period of four errors.

Recall that the multipathing driver 30 considers a path 60 to be flaky when the average number of IOs per failure on that path 60 falls within a flaky path range, i.e., when the average number of IOs per failure is greater than 1 and less than some upper limit. It should be further understood that the average number of IOs per failure for each path 60 is easily derived by dividing the IOs-Over-Period metric for that path 60 by the number of entries in the sorted list for that path 60. That is:

$$\text{Average Number of IOs per Failure} = \frac{\text{IOs-Over-Period metric}}{\text{Number of instance numbers in sorted list}}. \quad (1)$$

Since the depth of the sorted list was described above as three, the average number of IOs per failure for each path 60 equals the IOs-Over-Period metric divided by three. That is, the result of dividing the IOs-Over-Period metric by three is a running average of the number of IOs per failure on a path 60. Along these lines, if the result of dividing the IOs-Over-Period metric by three is greater than 1 and less than the upper limit of the flaky path range, the path 60 is flaky. However, if the result of dividing the IOs-Over-Period metric by three equals 1 the path 60 is not flaky since all IO requests 52 on the path 60 failed. Accordingly, this procedure of continually moving the set of intervals over which the failed IO requests 52 are measured is capable of distinguishing flaky paths 60 from paths 60 which consistently fail IO request 52 (i.e., paths 60 which, after path testing, may be labeled as dead).

It should be understood that it is unnecessary for the multipathing driver 30 to precisely calculate the IOs per failure parameter when determining whether a path 60 is flaky. Rather, as an optimization which avoids the need for a division operation, the multipathing driver 30 may simply compare the IOs-Over-Period metric to different limits to determine whether the a path 60 is flaky. Along these lines, the optimized evaluation can be represented as follows:

```
if (IOs-Over-Period=>FP-lower-limit) && (IOs-Over-Period<=FP-upper-limit)
{
perform remedial operation
}
```

Here, FP-lower-limit is set to one more than the number of instance numbers in the sorted list (e.g., FP-lower-limit=4 if the multipathing driver 30 stores the instance numbers of the last three failed IO requests 52). Again, FP-upper-limit is adjustable.

In this optimized evaluation, one will appreciate that the multipathing driver 30 simply calculates the IOs-Over-Period metric for a path 60 (e.g., by subtracting the oldest instance number in the sorted list from the instance number of the most recently dispatched IO request 52 to have failed), and then comparing the IOs-Over-Period metric to a flaky path range defined by the FP-lower-limit and FP-upper-limit values.

It should be understood that the particular value of the FP-upper-limit affects the sensitivity of the remedial operation trigger where a higher upper limit increases the sensitivity of the trigger. Additionally, the value of the FP-lower-limit is simply one more than the size of the sorted list, and its importance is in distinguishing a flaky path from a non-flaky path, when failure is not intermittent.

It should be further understood that the number of instances kept in the sorted list may vary from three. For example, in other arrangements, the number of instances in each sorted list is one, two, four, and so on). Further details will now be provided with reference to particular examples.

Example 1

Figure 4:
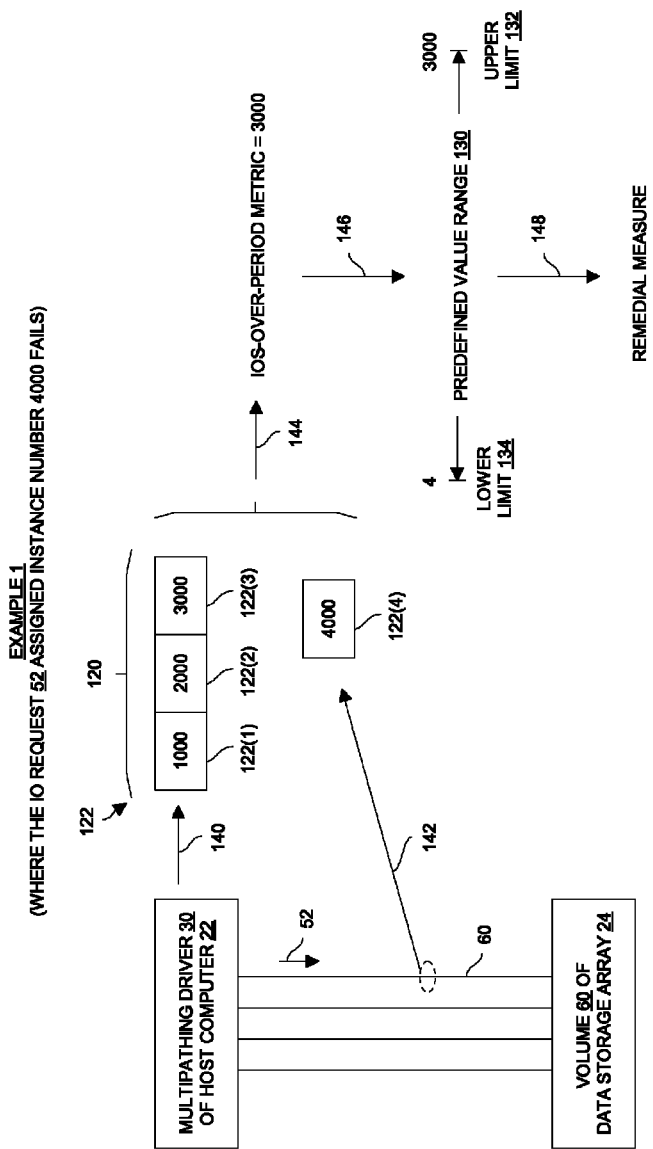
FIG. 4 is a block diagram showing particular details during a first flaky path situation.

FIG. 4 shows a sorted list 120 which is maintained by the multipathing driver 30 (FIG. 2) for each path 60. The sorted list 120 includes three entries 122(1), 122(2), 122(3) (collectively, list entries 122) which store the instance numbers of the last three failed IO requests 52 on that path 60.

FIG. 4 further shows a predefined value range 130 which includes an upper limit 132 and a lower limit 134. The upper limit 132 is adjustable and is set to a value of 3000. The lower limit is set to a value of 4 due to the sorted list 120 being three (3) entries 122 deep.

In this Example 1, suppose that IO request failures occur at instance numbers 1000, 2000, 3000, and 4000. As illustrated by the arrow 140, the multipathing driver 30 of the host computer 22 stores the instance numbers of the first three failed IO requests 52 in the entries 122(1), 122(2), 122(3) of the sorted list 120. It is important to note that the entry 122(1) stores the lowest instance number (i.e., 1000).

Upon the failure of the IO request 52 which was assigned instance number 4000, the multipathing driver 30 computes the IOs-Over-Period metric. In particular, the multipathing driver 30 outputs a result for a list entry 122(4) containing the instance number of the most recently dispatched IO request 52 to have failed (see arrow 142), and calculates the difference between that instance number (i.e., 4000) and the instance number of the least recently dispatched IO request 52 to have failed (i.e., 1000). Accordingly, as illustrated by the arrow 144, the multipathing driver 30 outputs the difference which is referred to as the IOs-Over-Period metric equals 3000 (i.e., 4000−1000=3000).

After the multipathing driver 30 computes the IOs-Over-Period metric, the multipathing driver 30 evaluates the IOs-Over-Period metric against a predefined value range 130 that has been deemed to be indicative of a flaky path. In particular, as illustrated by the arrow 146, the multipathing driver 30 compares the IOs-Over-Period metric against the upper limit 132 (e.g., a value of 3000) as well as against the lower limit 134 (e.g., a value of 4) to determine whether the IOs-Over-Period metric falls within the predefined value range 130.

In this example, the IOs-Over-Period metric does fall within the predefined value range 130. That is, the IOs-Over-Period metric equals 3000 which falls within the predefined flaky path range of 4-3000. Accordingly, as illustrated by the arrow 148, the multipathing driver 30 performs a remedial measure (e.g., a flaky path handling routine).

If the IOs-Over-Period metric had equaled 3001 (e.g., if the instance number assigned to the currently failed IO had been 4001), the IOs-Over-Period metric would not have fallen within the predefined flaky path range of 4-3000. In such a situation, the multipathing driver 30 would have considered the path 60 to be non-flaky (e.g., fully functional or active). As a result, the multipathing driver 30 would not have performed the remedial measure.

As part of the process, the multipathing driver 30 updates the sorted list 120 with the highest instance number entry 122(4). In particular, the multipathing driver 30 removes the lowest instance number entry 122(1) from the sorted list 120 and adds the new list entry 122(4) containing the highest instance number to the sorted list 120.

Example 2

Figure 5:
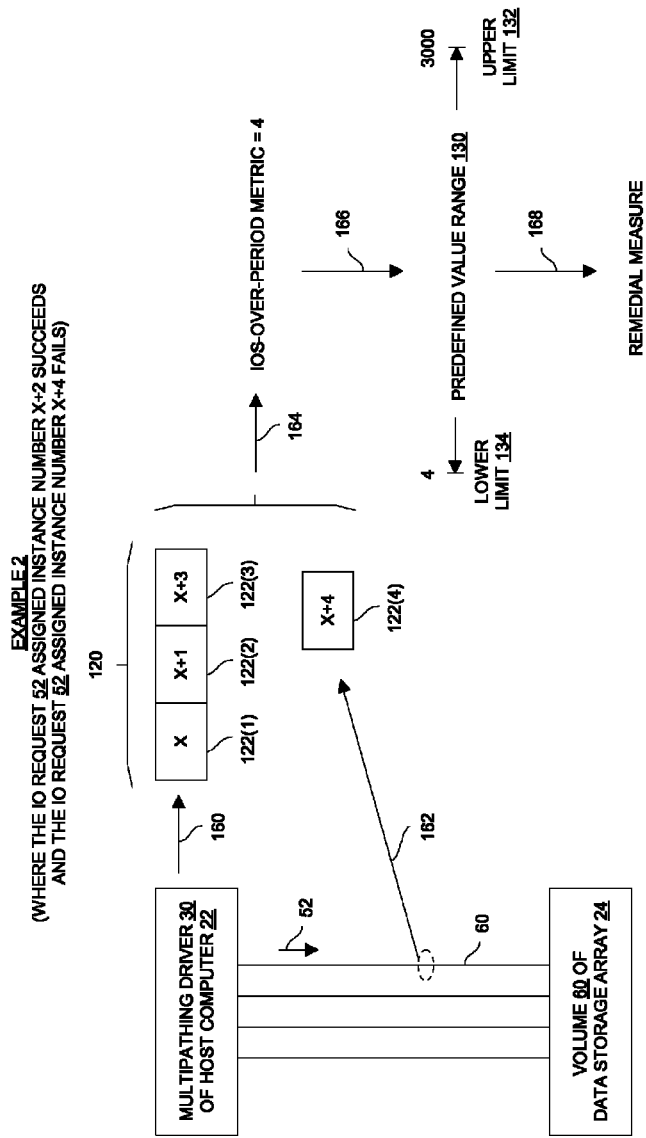
FIG. 5 is a block diagram showing particular details during a second flaky path situation.

FIG. 5 shows an example similar to that of Example 1. However, in this Example 2, suppose that the following sequence of events occur through the path 60:

| | |
|---|---|
| Instance Number X: | IO (e.g., SCSI read or write) fails |
| Instance Number X + 1: | IO (e.g., SCSI inquiry) fails |
| Instance Number X + 2: | IO (e.g., SCSI inquiry) succeeds |
| Instance Number X + 3: | IO (e.g., SCSI read or write) fails |
| Instance Number X + 4: | IO (e.g., SCSI inquiry) fails |

In particular, suppose that when a read or write IO request 52 at X fails, the multipathing driver 30 subsequently issues the IO request 52 at X+1 in order to test the path 60 and this test path IO (most likely a SCSI inquiry command) also fails. At this point, the multipathing driver 30 labels the path 60 as dead (because the test path IO failed). Later, during periodic path testing to see if any dead paths 60 are usable again, suppose that the multipathing driver 30 sends the IO request 52 at X+2 which succeeds; this is also a test path IO, most likely a SCSI inquiry command. Accordingly, the multipathing driver 30 labels the path 60 as alive. Once the path is marked alive, suppose that a read or write IO request 52 at X+3 fails and the test path IO request 52 at X+4 (most likely a SCSI inquiry command) fails. Such a scenario may exist when some SCSI inquiries succeed, but all SCSI reads and writes fail.

As illustrated by the arrow 160 of FIG. 4, the multipathing driver 30 (FIG. 2) of the host computer 22 stores the instance numbers of the last three failed IO requests 52 in the entries 122(1), 122(2), 122(3) of the sorted list 120. Of note, the entry 122(1) stores the lowest instance number (i.e., X). It should be understood that the multipathing driver 30 does not store the instance number X+2 within the sorted list 120 for the path 60 since the IO request 52 assigned instance number X+2 succeeded.

Upon the failure of the IO request 52 assigned instance number X+4 (see arrow 162), the multipathing driver 30 computes the IOs-Over-Period metric. Along these lines, the multipathing driver 30 calculates the difference between the highest instance number (i.e., X+4) and the lowest instance number (i.e., X). Accordingly, as illustrated by the arrow 164, the calculated difference which is referred to as the IOs-Over-Period metric equals 4 (i.e., X+4−X=4).

After the multipathing driver 30 computes the IOs-Over-Period metric, the multipathing driver 30 evaluates the IOs-Over-Period metric against the predefined flaky path range 130. In particular, as illustrated by the arrow 166, the multipathing driver 30 compares the IOs-Over-Period metric against the upper limit 132 (e.g., a value of 3000) as well as the lower limit 134 (e.g., a value of 4) to determine whether the IOs-Over-Period metric falls within the predefined flaky path range.

In this example, the IOs-Over-Period metric falls within the predefined flaky path range. That is, the IOs-Over-Period metric equals 4 which falls within the predefined flaky path range of 4-3000. Accordingly, as illustrated by the arrow 168, the multipathing driver 30 performs a remedial measure (e.g., a flaky path handling routine).

If the IOs-Over-Period metric had equaled 3 (e.g., if the IO assigned instance number X+2 has also failed), the IOs-Over-Period metric would not have fallen within the predefined flaky path range of 4-3000. Rather, in such a situation, the multipathing driver 30 would have considered the path 60 to be a non-flaky path, i.e., the average IOs per failure (i.e., the IOs-Over-Period metric divided by 3) is now equal to 1. As a result, the multipathing driver 30 would not have performed the flaky path remedial measure. In some arrangements, since the IOs-Over-Period metric falls below the lower limit of the predefined flaky path range 130, the multipathing driver 30 could run a dead path routine or some other routine to attend to a determination that the path 60 has completely failed.

Further Details

Figure 6:
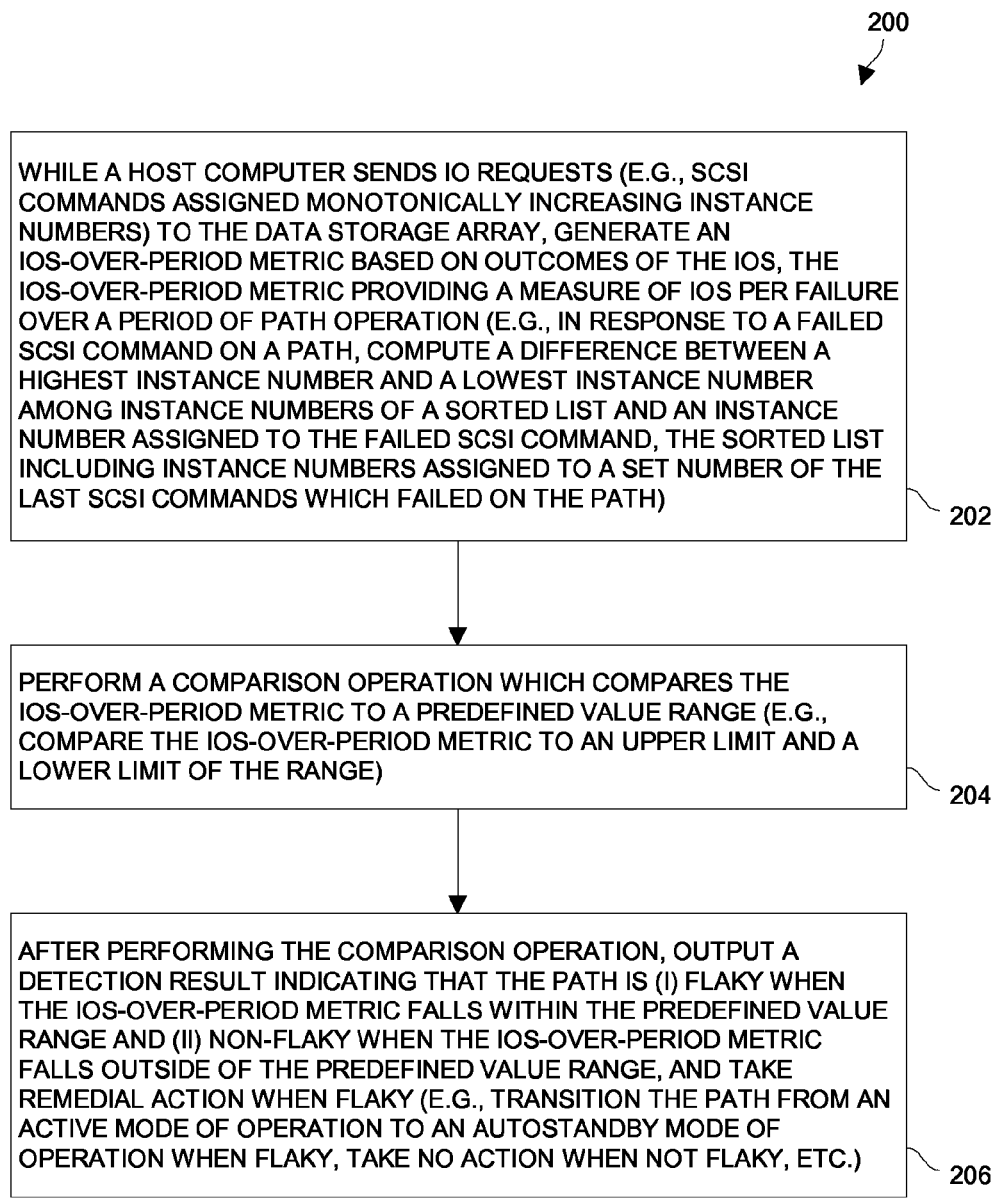
FIG. 6 is a flowchart of a procedure which is performed within the host computer for flaky path detection and avoidance.

FIG. 6 shows a flowchart of a procedure 200 which is performed by a multipathing driver 30 during flaky path detection. In step 202, the multipathing driver 30 generates an IOs-Over-Period metric 102 in response to IO request failures that have been determined to be path-related. In particular, while the multipathing driver 30 sends IO requests 52 to a volume of the array 24 (also see FIG. 1), the multipathing driver 30 identifies read or write IO requests 52 which failed on a particular path 60 to the volume but succeeded on another path 60 to the volume. It also identifies failures in path test IOs, such as SCSI inquiry commands. The multipathing driver 30 then computes, as the IOs-Over-Period metric, the difference between the highest instance number and the lowest instance number among the instance numbers in the sorted list and the instance number of the most recently failed IO request 52.

In step 204, the multipathing driver 30 performs a comparison operation which compares the IOs-Over-Period metric to a predefined flaky path range. In particular, the multipathing driver 30 compares the IOs-Over-Period metric to an upper limit and a lower limit of the predefined flaky path range.

In step 206, the multipathing driver 30 outputs, after performing the comparison operation, a detection result indicating that the particular path 60 is (i) flaky when the IOs-Over-Period metric falls within the predefined flaky path range and (ii) non-flaky when the IOs-Over-Period metric falls outside of the predefined flaky path range. Along these lines, when the detection result indicates that the particular path 60 is flaky, the multipathing driver 30 may activate of a remedial measure such as invocation of a routine which transitions a path from a fully functional or active mode of operation to an auto-standby mode of operation in which the path 60 is utilized only as a last resort.

As a result of such operation, the multipathing driver 30 of the host computer 22 is able to avoid routine use of the path 60 when it is flaky (i.e., when the path 60 intermittently fails). Accordingly, the host computer 22 enjoys reduced response time (e.g., IO requests 52 which would have been tried on the flaky path 60 are now tried on other paths 60 first).

Figure 7:
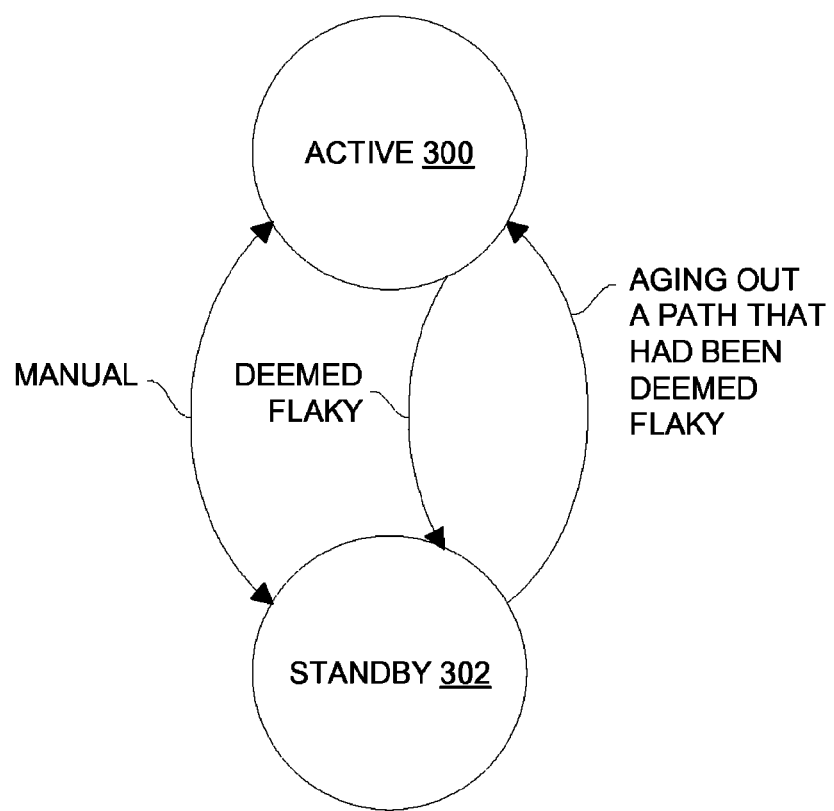
FIG. 7 is a state diagram for operating states of a path.

FIG. 7 shows a set of operating states or modes that can apply to an individual path 60, along with an indication of conditions for transitions between the modes. Each path 60 is in either an active mode 300 or a standby mode 302. Paths 60 in the active mode 300 are more generally used during path selection than paths 60 in the standby mode 302. However, paths 60 in the standby mode 302 are selected for use only under more restrictive circumstances. For example, a path 60 in the standby mode 302 may be selected for use if there are no paths 60 to the same volume that are in the active mode 300. This could occur, for example, if each active-mode path 60 experienced a failure.

As shown by the arrows in FIG. 7, the mode of the path 60 may be controlled manually where "manual" refers to action of an administrator for example, and automatically where "deemed flaky" and "aging out" refer to programmed actions of the multipathing driver 30. In connection with the "deemed flaky" transition, recall that in some arrangements when the multipathing driver 30 determines that a path 60 is flaky (i.e., when the IOs per failure falls within the flaky path range), the multipathing driver 30 modifies the operating mode of the path 60. In particular, multipathing driver 30 transitions the path 60 from the active mode 300 to the standby mode 302. In these arrangements, the multipathing driver 30 is further capable of reinstating the path 60, i.e., transitioning the path 60 from the standby mode 302 back to the active mode 300 after "aging out" or after a predetermined amount of time has passed (e.g., seven days).

In the connection with manual control, this mechanism enables an administrative user to independently affect operational behavior. For example, if an administrative user becomes aware of a reason that the path 60 should preferably not be used, the user may manually place the path 60 into the standby mode 302. When this has occurred, the path 60 can only be placed back into the active mode 300 by another manual operation—the multipathing driver 30 does not override this manual setting.

It should be understood that the operating modes of the paths 60 may or may not persist across a re-booting of the host computer 22 or re-starting of the multipathing driver 30. In many cases it will be desirable for manual settings to persist. It may be desirable for automatic settings to be recalculated. If a path 60 has been set to the standby mode 302 by the driver 30, then upon a re-start the path 60 may initially be in the active mode 300 by default.

It should be further understood that the above-described flaky path detection and avoidance mechanism is independent of IO rate and robustly and reliably identifies flaky paths even for idle or near-idle paths 60. In particular, the multipathing driver maintains a running behavioral pattern for each path 60, and incorporates the results of its own periodic probing for path errors, thereby detecting some types of flakiness even in the total absence of read-write IOs. Furthermore, such flaky path detection and avoidance is associated with a pattern of behavior, not just what happens after one dead-live transition. With the multipathing driver 30, a flaky path 60 that undergoes a dead-live transition will still be avoided for IOs until the aging period expires.

While various embodiments of the invention have been particularly shown and described, it will be understood by those skilled in the art that various changes in form and details may be made therein without departing from the spirit and scope of the invention as defined by the appended claims.

For example, the IO requests 52 were described above as being SCSI commands (e.g., SCSI read commands, SCSI write commands, SCSI inquiry commands, etc.). It should be understood that the techniques may be applied to other protocols and styles of communications as well such as IP-based messages, wireless signals, and so on.

Additionally, it should be understood that a value of 3000 was described as an upper limit for the predefined flaky path range by way of example only. In other arrangements, the upper limit for the predefined flaky path range has a different value (e.g., 4000, 6000, and so on).

Furthermore, it should be understood that the multipathing driver 30 may modify its operation of evaluating the IOs-Over-Period metric when the monotonically increasing instance numbers for IO requests 52 on the paths 60 wrap around. For example, the values of the instance numbers within the sorted lists 120 or the manner in which the differences are calculated can be adjusted to account for such wrap around.

Additionally, one will appreciate that the depth of the sorted lists 120 is three in some embodiments. However, in other embodiments the depth is a different number (4, 5, etc.). Along these lines, deeper sorted lists 120 may take more resources to maintain and will affect how quickly the multipathing driver 30 responds to changes in conditions.

Furthermore, it should be understood that the multipathing driver 30 was described by way of example as assigning monotonically increasing instance numbers as the IO requests 52 are issued from the multipathing driver 30. In some arrangements, the multipathing driver 30 assigns instance numbers as IO responses come back on the paths 60. In arrangements in which the instance numbers are assigned at the time of IO response, the list is naturally sorted thus alleviating the need to sort the list separately. Such modifications and enhancements are intended to belong to particular embodiments of the invention.

What is claimed is:

1. A method of overseeing a path between a multipathing driver of a host computer and a volume of a data storage array, the method comprising:
   while the multipathing driver of the host computer sends input/output requests (IOs) to the volume of the data storage array on the path, generating an IOs-Over-Period metric based on outcomes of the IOs, the IOs-Over-Period metric providing a measure of IOs per failure over a period of path operation;
   performing a comparison operation which compares the IOs-Over-Period metric to a predefined flaky path range having a predefined lower limit and a predefined upper limit; and
   after performing the comparison operation, outputting a detection signal indicating that the path is (i) flaky when the IOs-Over-Period metric falls within the predefined flaky path range and (ii) non-flaky when the IOs-Over-Period metric falls outside of the predefined flaky path range;
   wherein the IOs sent from the multipathing driver to the volume on the path include a series of small computer system interface (SCSI) commands; and
   wherein generating the IOs-Over-Period metric based on the outcomes of the IOs includes assigning a series of monotonically increasing instance numbers to the series of SCSI commands to distinctively identify each SCSI command of the series of SCSI commands with an instance number.

2. A method as in claim 1 wherein generating the IOs-Over-Period metric further includes:
   maintaining a sorted list of instance numbers assigned to a set number of the last SCSI commands which failed on the path.

3. A method as in claim 2 wherein generating the IOs-Over-Period metric further includes:
   in response to a failed SCSI command, computing, as the IOs-Over-Period metric, a difference between a highest instance number and a lowest instance number among the instance numbers of the sorted list and the instance number assigned to the failed SCSI command.

4. A method as in claim 3 wherein sorted list is constructed and arranged to include N instance numbers; and wherein the method further comprises:
   receiving an upper value, and
   prior to generating the IOs-Over-Period metric, setting (i) the predefined upper limit of the predefined flaky path range based on the upper value and (ii) the predefined lower limit of the predefined flaky path range equal to N+1.

5. A method as in claim 4 wherein performing the comparison operation which compares the IOs-Over-Period metric to the predefined flaky path range includes:
   comparing the computed difference to the predefined upper limit of the predefined flaky path range, and
   comparing the computed difference to the predefined lower limit of the predefined flaky path range.

6. A method as in claim 5 wherein outputting the detection signal includes:
   providing, as the detection signal, a first value when the difference is (i) less than or equal to the predefined upper limit of the predefined flaky path range and (ii) greater than or equal to the predefined lower limit of the predefined flaky path range to indicate that the path is flaky, and otherwise providing a second value to indicate that the path is non-flaky.

7. A method as in claim 3, further comprising:
   overwriting, in a buffer containing the sorted list, the lowest instance number in the sorted list with the instance number assigned to the failed SCSI command.

8. A method as in claim 2, further comprising:
   in response to a determination that the multipathing driver of the host computer successfully completed a retry of a failed read or write SCSI command on another path extending between the multipathing driver of the host computer and the volume of the data storage array to determine whether the failed read or write SCSI command is malformed, invoking an IOs-Over-Period metric generation operation to generate the IOs-Over-Period metric.

9. A method as in claim 1 wherein assigning the series of monotonically increasing instance numbers to the series of SCSI commands includes:
assigning each instance number to a respective SCSI command as the multipathing driver dispatches that respective SCSI command on the path.

10. A method as in claim 1 wherein assigning the series of monotonically increasing instance numbers to the series of SCSI commands includes:
assigning each instance number to a respective SCSI command as a SCSI response to the respective SCSI command arrives at the multipathing driver.

11. A method as in claim 1 wherein the series of SCSI commands includes a mixture of SCSI read commands, SCSI write commands and SCSI inquiry commands; and
wherein assigning the series of monotonically increasing instance numbers to the series of SCSI commands includes:
reading a first counter value from a counter and assigning the first counter value to a first SCSI command of the mixture of SCSI read commands, SCSI write commands and SCSI inquiry commands,
incrementing the counter, and
reading a second counter value from the counter and assigning the second counter value to a second SCSI command of the mixture of SCSI read commands, SCSI write commands and SCSI inquiry commands.

12. A method as in claim 1 wherein other paths extend between the multipathing driver of the host computer and the volume of the data storage array;
wherein the host computer sends a separate series of SCSI commands on each of the other paths; and
wherein the method further comprises assigning a respective series of monotonically increasing instance numbers to the separate series of SCSI commands sent through each of the other paths.

13. A method as in claim 1, further comprising:
in response to the detection signal indicating that the path is flaky, invoking a remedial flaky-path operation.

14. A method as in claim 13 wherein invoking the remedial flaky-path operation includes:
automatically transitioning an operating mode of the path from an active mode to a standby mode in response to the detection signal indicating that the path is flaky; and
wherein, when the path is in active mode, the multipathing driver of the host computer routinely sends IOs to the volume of the data storage array on the path in a highly available manner; and
wherein, when the path is in the standby mode, the multipathing driver of the host computer sends IOs to the volume of the data storage array on the path in a last resort manner only after the multipathing driver of the host computer has tried all other paths to the volume of the data storage array which were in active mode.

15. A method as in claim 14, further comprising:
automatically transitioning the operating mode of the path from the standby mode back to the active mode in response to an aging circuit reaching a maximum standby mode time amount.

16. A method as in claim 13 wherein the host computer, the data storage array and the path form at least part of a data storage environment; and wherein performing the remedial flaky-path operation includes:
in response to the detection signal indicating that the path is flaky, sending an alert message to an administrator of the data storage environment.

17. A method as in claim 13 wherein performing the remedial flaky-path operation includes:
in response to the detection signal indicating that the path is flaky, automatically triggering a root cause analysis system which is constructed and arranged to collect and analyze path data corresponding to the path.

18. A method as in claim 1 wherein the IOs-Over-Period metric is derived by subtracting a lower instance number from a higher instance number to indicate a total number of SCSI commands that have been sent from the multipathing driver to the volume on the path while a predefined number of IOs have failed on the path.

19. A non-transitory computer readable storage medium storing a set of instructions which, when carried out by computerized circuitry, causes the computerized circuitry to oversee a path between a multipathing driver of a host computer and a volume of a data storage array by performing a method comprising:
while the multipathing driver of the host computer sends input/output requests (IOs) to the volume of the data storage array on the path, generating an IOs-Over-Period metric based on outcomes of the IOs, the IOs-Over-Period metric providing a measure of IOs per failure over a period of path operation;
performing a comparison operation which compares the IOs-Over-Period metric to a predefined flaky path range having a predefined lower limit and a predefined upper limit; and
after performing the comparison operation, outputting a detection signal indicating that the path is (i) flaky when the IOs-Over-Period metric falls within the predefined flaky path range and (ii) non-flaky when the IOs-Over-Period metric falls outside of the predefined flaky path rang;
wherein the IOs sent from the multipathing driver to the volume on the path include a series of small computer system interface (SCSI) commands; and
wherein generating the IOs-Over-Period metric based on the outcomes of the IOs includes assigning a series of monotonically increasing instance numbers to the series of SCSI commands to distinctively identify each SCSI command of the series of SCSI commands with an instance number.

20. A host apparatus, comprising:
an interface constructed and arranged to communicate with a data storage array;
memory constructed and arranged to store a predefined flaky path range having a predefined lower limit and a predefined upper limit; and
a controller coupled to the interface and the memory, the controller being constructed and arranged to:
while a multipathing driver sends input/output requests (IOs) to a volume of a data storage array on a path through the interface, generating an IOs-Over-Period metric based on outcomes of the IOs, the IOs-Over-Period metric providing a measure of IOs per failure over a period of path operation,
performing a comparison operation which compares the IOs-Over-Period metric to the predefined flaky path range, and after performing the comparison operation, outputting a detection signal indicating that the path is (i) flaky when the IOs-Over-Period metric falls within the predefined flaky path range and (ii) non-flaky when the IOs-Over-Period metric falls outside of the predefined flaky path range;

wherein the IOs sent from the multipathing driver to the volume on the path include a series of small computer system interface (SCSI) commands; and wherein the controller, when generating the IOs-Over-Period metric based on the outcomes of the IOs, is constructed and arranged to assign a series of monotonically increasing instance numbers to the series of SCSI commands to distinctively identify each SCSI command of the series of SCSI commands with an instance number.

* * * * *